United States Patent [19]
Dailey

[11] Patent Number: 5,433,031
[45] Date of Patent: Jul. 18, 1995

[54] RESILIENT EDGES FOR POWER OPERATED DOORS

[75] Inventor: George W. Dailey, Palatine, Ill.

[73] Assignee: Mark IV Transportation Products Corporation, Niles, Ill.

[21] Appl. No.: 223,904

[22] Filed: Apr. 6, 1994

[51] Int. Cl.⁶ .............................................. E05F 15/02
[52] U.S. Cl. ...................................... 49/27; 49/483.1
[58] Field of Search .............. 49/475.1, 483.1, 116, 49/117, 118, 119, 120, 121, 122, 123, 26, 27, 28, 366, 367, 368, 369, 370

[56] References Cited

U.S. PATENT DOCUMENTS

| | | | |
|---|---|---|---|
| 2,797,958 | 7/1957 | Podolan | 49/483.1 X |
| 3,461,611 | 8/1969 | Axe | 49/483.1 |
| 4,195,732 | 4/1980 | Bell | 206/391 |
| 4,435,463 | 3/1984 | Roellchen | 428/158 |
| 5,280,754 | 1/1994 | Flannagan et al. | 105/341 |

FOREIGN PATENT DOCUMENTS

| | | | |
|---|---|---|---|
| 1342662 | 9/1963 | France | 49/483.1 |
| 2205345 | 12/1988 | United Kingdom | 49/483.1 |

Primary Examiner—Jerry Redman
Attorney, Agent, or Firm—Francis J. Lidd

[57] ABSTRACT

A pair of flexible interlocking edges for power operated doors primarily used on mass transit vehicles such as subway cars. If door closing is prevented, edge design allows withdrawal of obstructions, including deformable objects caught in the interstices of mating edges.

10 Claims, 3 Drawing Sheets

RESILIENT EDGES FOR POWER OPERATED DOORS

CROSS-REFERENCE TO RELATED APPLICATIONS

The application relates to the subject matter disclosed and claimed in U.S. Pat. No. 5,280,754, the specification of which is incorporated herein by reference. Said patent and the invention disclosed and claimed herein being assigned to the same assignee. This invention relates generally to flexible edges used to seal edges of power operated doors used on mass transit vehicles. More specifically, this invention relates to improved removal of obstructions to closing doors in day-to-day vehicle operation.

BACKGROUND OF THE INVENTION

It is well known that efficient operation of mass transit vehicles is highly dependent on moving passengers into and out of the vehicles in allotted time. If, after opening, doors are obstructed or prevented from closing for various reasons, design of the vehicle is such that the entire train is prevented from moving. If with presently used edges the obstruction is of the type that essentially allows the doors to close with a deformable obstruction such as clothing and/or straps used to hold purses or cameras trapped between door edges, removal is very difficult, and a passenger hazard exists.

The invention disclosed herein comprises use of resilient door edges which are in abutment for the doors in a closed position. The edges are configured to prevent train movement if the doors are obstructed by a substantial object and allow easy withdrawal of deformable material from a preferred direction, as mentioned above, from a trapped or captured position between abutting edges.

Accordingly, it is an object of this invention to provide a resilient sealing edge for bi-parting power operated doors suitable for use in door systems controlling passenger flows into and out of a mass transit vehicle, wherein door closure and train movement is prevented when a substantial obstruction to door closing is present.

It is an additional object of the invention to provide a resilient sealing edge for the above-mentioned mass transit vehicle whereby deformable objects captured by abutting door edge seals can be easily withdrawn.

It is a further object of the invention to provide a sealing door edge for power operated doors suitable for use on a mass transit vehicle wherein for a door closed position, the interstices between abutting increase on withdrawal of a trapped deformable object.

SUMMARY OF THE INVENTION

A resilient sealing edge is located at the passenger interface intermediate abutting edges of bi-parting doors used to control passenger ingress and egress in a mass transit vehicle.

The particular seal configuration utilizes mating or interlocking edges to seal doors in a closed position. When closed, the abutting door edges define an interstice or inter-edge space. On closing, a deformable material, such as cloth, carrying straps or some sort of other deformable material made of cloth, including belts, coats, sleeves, and scarfs, are located within the interstices and held by the edges. Under these conditions, force on any of the above-mentioned deformable material, if applied in the preferred direction and essentially perpendicular to the door panel face, interstitial spaces are substantially increased, thereby decreasing the amount of friction between the deformable material and the interlocking edge, and greatly reducing the force required to withdraw the deformable object from its trapped position.

In an alternate situation, if a substantial, non-deformable object, deemed a deformable obstruction, is trapped between the resilient edges, the configuration of this invention acts to prevent further door motion. In this situation, obstruction of the door closing is relatively large and, given the door control system, vehicular motion is prevented.

The novel door edge disclosed herein facilitates withdrawal of trapped deformable obstructions while detecting substantial obstructions, and is, therefore, a substantial step forward in the art of transit car operation and an associated reduction of passenger hazards during car operation.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT OF THE INVENTION

Figure 1:
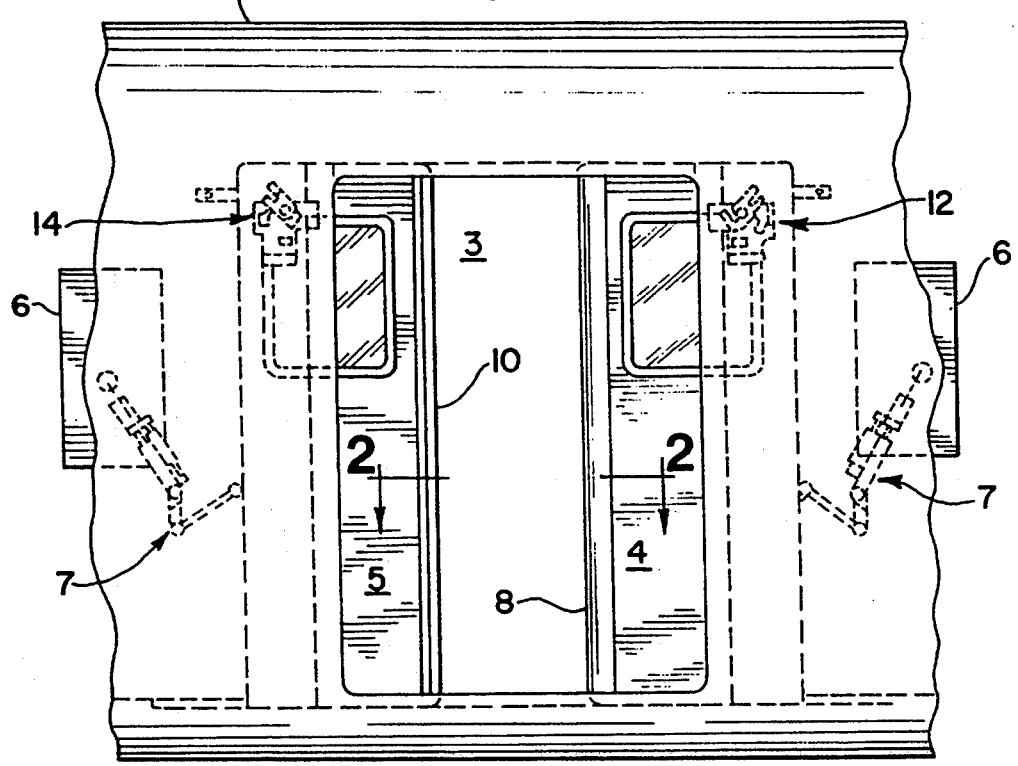
FIG. 1 is a front view of a portion of a typical transit vehicle wherein the edges disclosed in this invention can be used.

With particular reference to FIG. 1, there is shown a partial representation of a car body 2 showing bi-parting door leaves 4 and 5 driven by power operators 6 to open and closed position over an opening 3 in the side wall of car body 2. Also shown are door obstruction sensing and free-wheeling panel detection switch assemblies 12 and 14 (not a part of the invention, but disclosed in more detail in above-mentioned U.S. Pat. No. 5,280,754. Door panels 4 and 5 are mounted in car body 2 by saltable hanger means (not shown) and are moved from opened to closed over the opening 3 through drive arm assemblies 7. The internal or mating edges of door panels 4 and 5 constituting the door/passenger interface, have edges 8 and 10, respectively, attached thereto.

Figure 2:
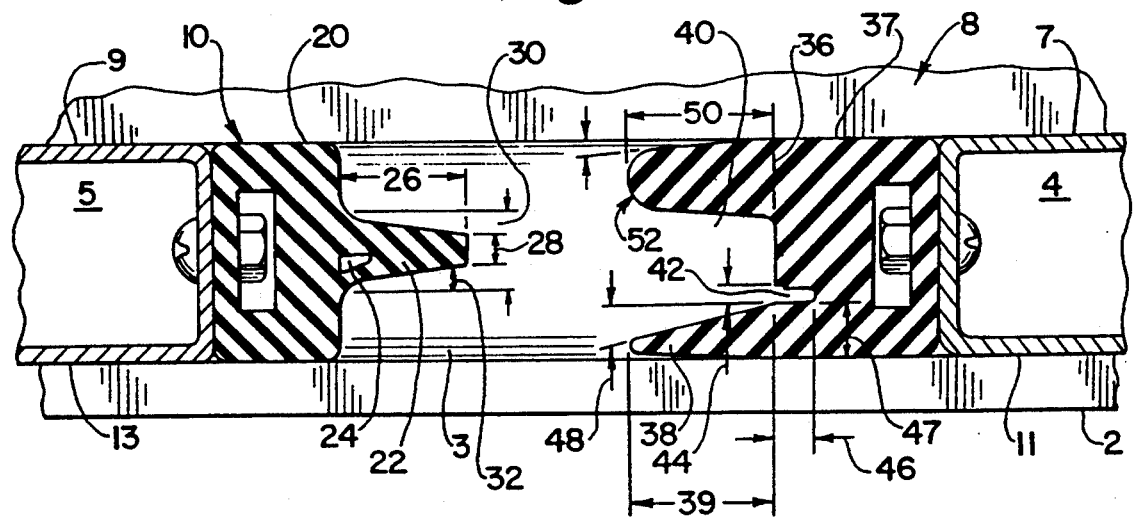
FIG. 2 is a partial section along the lines 2—2 of FIG. 1 particularly showing in section the edges of the invention attached to bi-parting door panels in a partially closed and unobstructed position.

Turning now to FIG. 2, there is shown in partial cross-section passenger interface edges 8 and 10 attached to door panels 4 and 5, respectively. As shown, panel surfaces 7 and 9 face the inside of car body 2, whereas, surfaces 11 and 13 are outside surfaces, respectively, of panels 4 and 5.

As shown (reference FIG. 2), edge 10 includes a tongue-like projection 22 having a nominal length 26 projecting from a base 20. A continuous internal, longitudinal cavity 24 is strategically located internal of and parallel to the tongue 22, adjacent the base 20. Additional details of left hand edge 10 and its contribution to the objects of this invention will be covered in more detail.

The right hand mating or cooperating edge 8 includes a base 37 suitably fastened to door panel 4, as shown. Projecting from the base 37 is a projection 36 adjacent the inside surface of panel 7 and a projection 38 having a taper of 5° from said outer or inner projection base to end and adjacent the outside surface of panel 4, thereby forming a recess or cavity 40. A longitudinal groove 42 projecting into the base 37 is located adjacent the outer projection 38 and having a taper of 12° from the base to the end of the projection, as shown. As in the case of edge 10 discussed above, further details of the projections 36, 38, and groove 42 and their importance in the invention disclosed herein will be further discussed in more detail.

Figure 3:
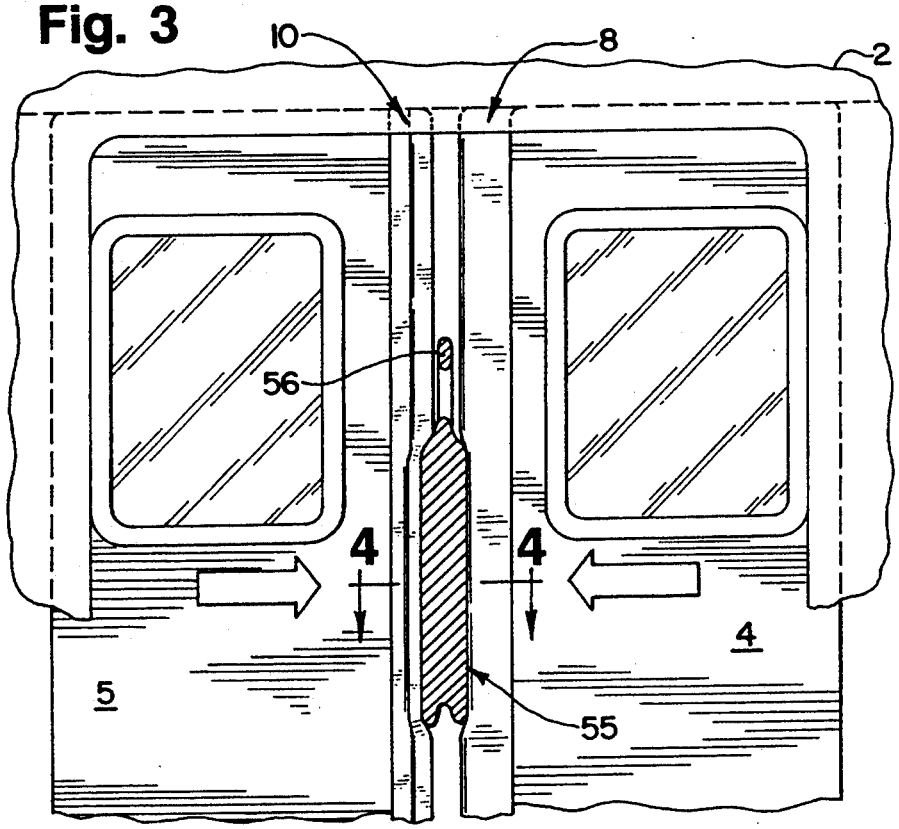
FIG. 3 is an additional front view of a typical transit car utilizing the edges of the invention, particularly showing the edges having a substantial obstruction trapped between the edges.
Figure 4:
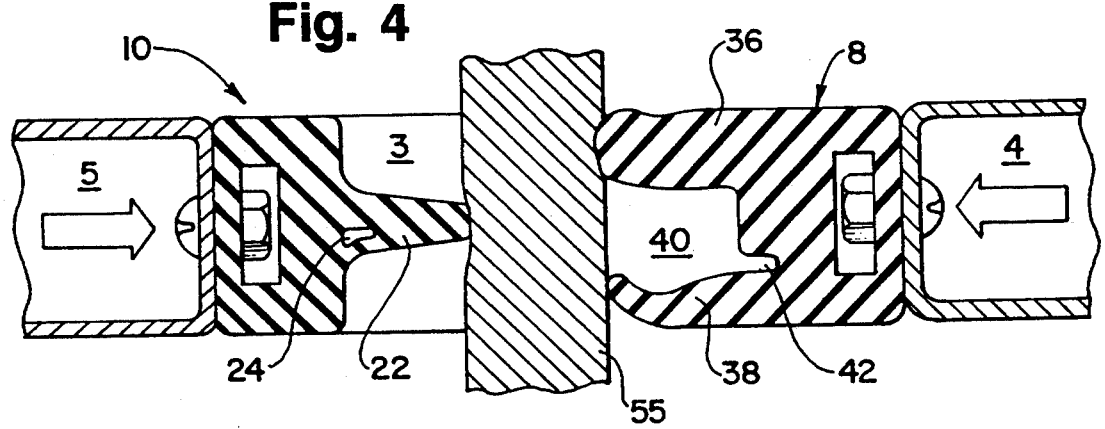
FIG. 4 is a section along the lines 4—4 of FIG. 3 showing in section the edges of the invention and the substantial obstruction of FIG. 3 with the doors in a partially closed position and particularly showing the substantial obstruction between the edges of the invention.
Figure 5:
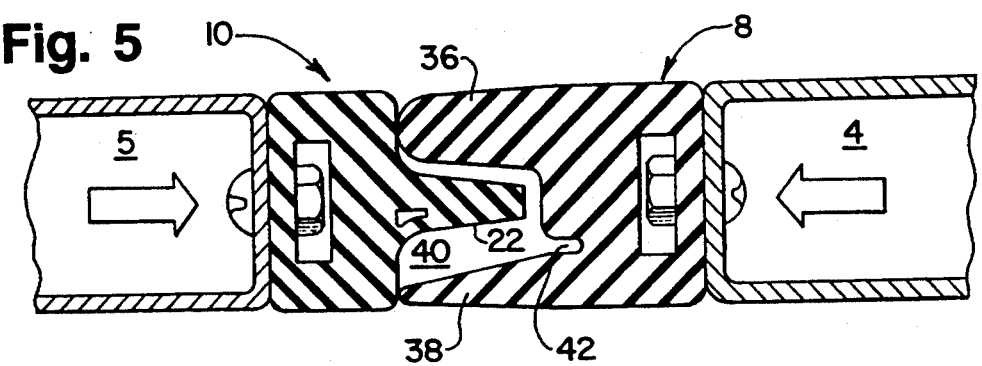
FIG. 5 is an additional partial section of the edges of the invention particularly showing the door panels in an unobstructed fully closed position.

Now turning to FIGS. 3 and 4, FIG. 3 shows door panels 4 and 5 in a partially closed position wherein edges 8 and 10 have essentially trapped a substantial obstruction 55 to door closing. Shown schematically in cross section as a briefcase or carrying bag having a handle 56 and a more substantial body 55. As shown in FIG. 4, although partially deformed edges 8 and 10 do not allow door panels 4 and 5 to move to a fully closed position shown in FIG. 5. Given the degree of door partial closing, the door system disclosed and claimed in above-mentioned U.S. Pat. No. 5,280,754 would prevent movement of the train until the obstruction was removed. It should be noted that an obstruction of a type not deformed or entering the cavity 40 would prevent door closure and subsequent train motion.

Figure 6:
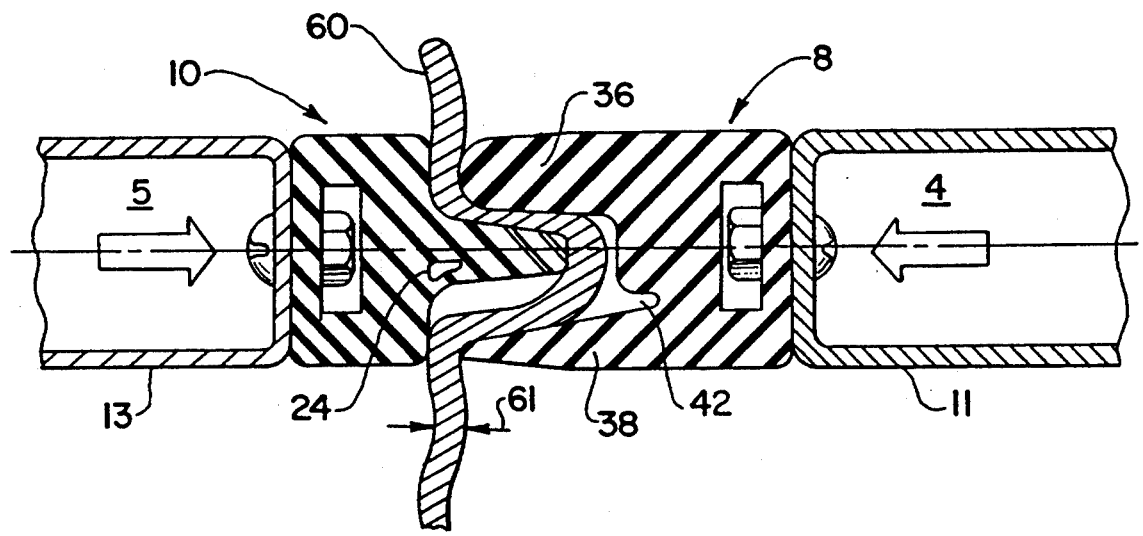
FIG. 6 is a partial section with the edges of the invention attached to door panels, particularly showing a deformable obstruction trapped in the edge interstices.
Figure 7:
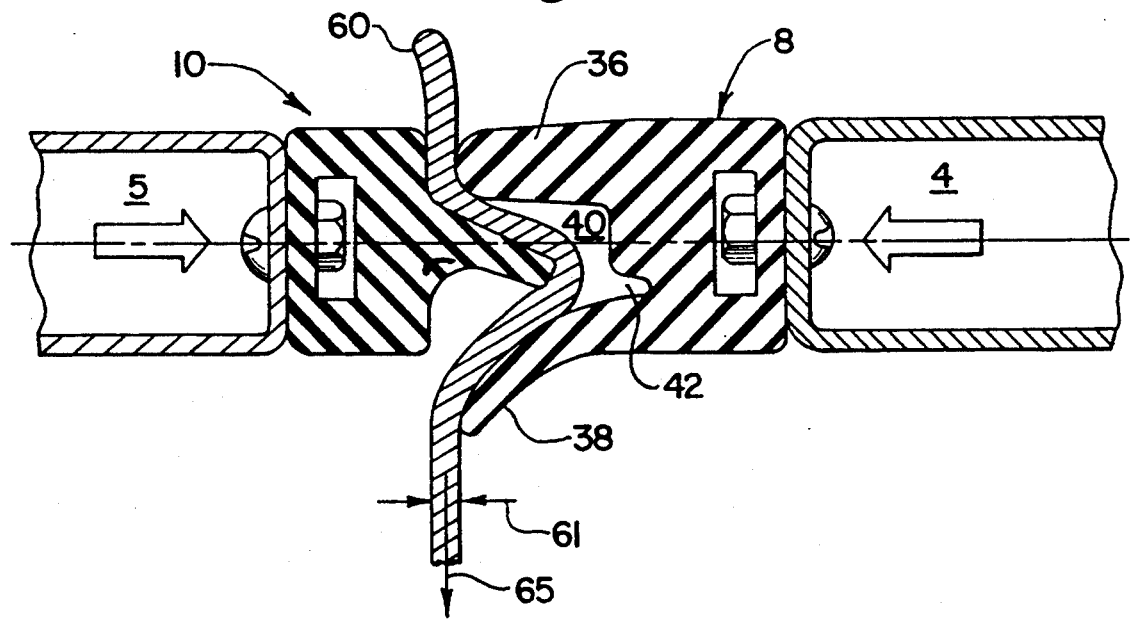
FIG. 7 is an additional partial section of the edges of the invention similar to FIG. 6, particularly showing action of the elements of the edges of the invention during removal of the deformable obstruction.

Turning now to FIGS. 6 and 8 there is shown a deformable obstruction 60 having a thickness 61. An obstruction of this type can be a handbag, strap, clothing, or cloth wearing apparel such as scarfs, or portions of a passenger's coat. As shown in FIGS. 6 and 7, the door panels 4 and 5 are in a closed position, thereby allowing the train or transit car to begin motion.

Under these conditions, the most hazardous situation occurs when the passenger whose clothing or other attached object is adjacent surfaces 11 and 13 and outside the car. Should this occur, car door panels equipped with the edges of this invention facilitate withdrawal of a trapped, deformable obstruction, through movement of projections 22, 36 and 38, as shown.

In operation, as shown in FIGS. 6 and 7, deformable material 60 is restrained in interstice 3 defined by edges 8 and 10 when panels 4 and 5 are in a closed position. However, as shown in FIG. 7, when force 65 is exerted in the indicated direction, the deformable material or obstruction 60 deflects edge projection 38, and tongue 22, as shown, thereby reducing frictional forces on the interface between material 61 and contact areas of projections 38, 36, and 22, aiding withdrawal of material or obstruction 60. Cavity 24, groove 42, and the geometry of projection 38 are critical to providing withdrawal of obstruction 60.

Applicant has discovered that the particular configuration disclosed also provides for prevention of train motion in the presence of a substantial obstruction while allowing a deformable obstruction to be withdrawn either by passenger action or relative movement between the train and a passenger outside the train.

Typically, applicant has found that a typical but not limiting edge design as shown incorporates the following parameters:

Edge Assembly 10
Durometer 80.
Base Height 20–$\frac{3}{8}''$;
Tongue Projection 26–$\frac{3}{8}''$;
Tongue Taper 30 & 32–7°;
Tongue 22; Outer Edge 28–9/64'':
Cavity 24 Area Approximately 0.01 inches$^{2'}$
Ratio of Cavity 24 Area to Area of Tongue 22–0.063.
Edge Assembly 8
Durometer 80.
Base Thickness 37–1'',
Inner Projection 36 Height 50–11/16'';
Inner Projection Mating Edge Radius 52–9/64'';
Outer Projection 38 Length 39–11/16'';
Outer Projection 38 Base Thickness 48$\frac{1}{4}''$;
Groove 42 Depth 46–7/64'';
Groove 42 Thickness 44–5/64'';
Groove 42 Distance 47 From Outer Edge 11–9/16'';
Ratio of Groove Depth 46 to Projection 38, Length 39–b 0.17.

Thus it is apparent that there has been provided in accordance with the invention disclosed herein, resilient door edges for bi-parting power operated doors utilized on mass transit vehicles that fully satisfies the objects, aims and advantages set forth above. While it has been described in conjunction with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed as new and desired to be secured by Letters Patent of the United States is:

1. In a system for power operation of bi-parting doors on mass transit vehicles, for controlling passenger movement into and out of said vehicles, said system incorporating obstruction sensing for preventing car movement until the doors are fully closed, resilient edges on said doors cooperating to seal fully closed doors at the door-passenger interface, said door edges allowing withdrawal of trapped deformable objects therebetween comprising:

a transit vehicle having an opening in a side wall;
first and second door panels movable from opened to closed over said opening;
inner and outer surfaces on said panels;
a first resilient edge on said first panel having a base and a first projection extending therefrom, said projection resiliently deflectable about said base on application of a force thereto;

means in said first projection providing greater deflection in movement from said inner to outer panel surfaces than from outer to inner panel surfaces on application of said force thereto;

a second resilient edge on said second panel, said resilient edge having a base and inner and outer projections extending therefrom, said projections, respectively, adjacent to said inner and outer panel surfaces;

means in said base of said second resilient edge and said outer projection providing greater deflection in movement from said inner to outer panel surface than from movement from said outer to inner panel surface on application of said force thereto;

a recess defined by and intermediate said second resilient edge projections and base;

an interstice defined by said first and second resilient edges when said first resilient edge projection enters said recess and said panels are in a fully closed position over said car body opening;

a deformable material in said interstice;

wherein withdrawal of said deformable material in said interstice in a direction from said inside panel surface to said outside panel surface exerts said force on said projections and said inside to outside-deflection of said resilient edge projections permits withdrawal of said material.

2. The system of claim 1 wherein said means providing deflection in said resilient edge is a closed cavity in said first projection adjacent said base, said cavity extending along said projection; and, said means providing deflection in said second resilient edge is a groove in said base extending into said second resilient edge, said groove being adjacent said outer projection of said second resilient edge.

3. The system of claim 1 wherein said tongue-like projection further comprises:
said bases to length ratio of 0.98;
a ratio of cavity cross-sectional area to tongue-like projection cross-sectional area of 0.063.

4. The combination of claim 3 wherein said second projection has a taper of 5° from base to end, and said first projection has a taper of 12° from base to end.

5. The system of claim 1 wherein said second resilient edge projections further comprise:
a taper of 12° from said base to end of said first projection;
a taper of 5° from said outer or inner projection base to end.

6. In a system for power operation of bi-parting doors on mass transit vehicles, having obstruction sensing for preventing car movement until doors are fully closed, resilient door edges cooperating to seal fully closed doors and allow withdrawal of trapped deformable objects therebetween comprising:
a transit vehicle having an opening in a side wall;
first and second door panels movable from opened to closed over said opening;
a first resilient edge on said first panel having a base and a tongue-like projection extending therefrom;
a closed cavity in said tongue-like projection, said cavity adjacent said base and extending along said tongue-like projection;
a second resilient edge on said second panel, said second edge having a base and first and second projections extending therefrom;

a recess defined by and intermediate said second edge projections and base;

a groove in said second edge base, said groove extending into said second edge base, said groove adjacent said first projection;

an interstice defined by said first and second edges when said tongue enters said recess and said first and second panels are in a fully closed position over said vehicle side wall opening;

wherein said first and second door panel edges and interstices seal said door panels along the first and second edges when said panels are fully closed.

7. In combination, resilient door edges for sealing power operated panels of a bi-parting door system for use on a transit vehicle comprising:
a first edge on one of said bi-parting doors having a tongue projection;
a cavity in said first edge, said cavity extending along said first edge;
a second edge on the other of said bi-parting doors, said second edge having a base with first and second projections extending therefrom;
a space, intermediate said projections, said space in alignment with said tongue, said space having inner edges and including said base;
a groove in said base, said groove adjacent said second projection and extending into said base;
an inter-edge space defined by said tongue and recess when said edges are in abutment for a door closed position.

8. In a system for power operation of bi-parting doors on mass transit vehicles, for controlling passenger movement into and out of said vehicles, said system incorporating obstruction sensing for preventing car movement until the doors are fully closed, resilient door edges cooperating to seal fully closed door edges at a passenger interface, and allow withdrawal of trapped deformable objects therebetween comprising:
a transit vehicle having an opening in a side wall;
first and second door panels movable from opened to closed over said opening;
inner and outer surfaces on said panels;
a first resilient edge on said first panel having a base and projection extending therefrom, said projection having an outer face adjacent said inner panel surface and resiliently deflectable about said base on application of a force thereto;
means in said projection providing greater deflection in movement from said inner to outer panel surfaces than from outer to inner panel surfaces on application of a first force thereto;
a second resilient edge on said second panel, said second edge having a base and inner and outer projections extending therefrom, said projections respectively adjacent to said inner and outer panel surfaces;
an inner face on said outer projection;
means in said second base outer projection providing greater deflection in movement of said second edge outer projection in a direction from said inner to outer panel surface than from movement in a direction from said outer to inner panel surface on application of a second force thereto;
a recess defined by and intermediate said second edge projections and base;
an interstice defined by said first and second edges when said first edge projection enters said recess and said first edge base and second edge projections abut, and said panels are in a fully closed position over said car body opening;

a gap in said interstice defined by said outer face on said first resilient edge projection and said inner face on said second edge outer projection;

a deformable material in said interstice; said material extending through said gap, wherein said gap increases on deflection of said first edge projection and second edge outer projection when said deformable material exerts said first and second forces in moving in a direction from said inside to said outside panel surfaces.

9. In a system for power operation of biparting doors in a mass transit vehicle for controlling passenger travel into and out of said vehicle, said system incorporating obstruction sensing for preventing car movement, until said doors are fully closed, resilient edges on said doors cooperating to seal fully closed doors at a door-passenger interface, said door edges allowing withdrawal of trapped deformable objects therebetween comprising:

said transit vehicle having an opening in the side wall;

first and second door panels movable from open to closed over said opening;

inner and outer surfaces on said panels;

a first resilient edge on said first panel having a first base and a first projection extending therefrom, said projection resiliently deflectable about said base on application of a first force thereto;

means in said first base projection providing greater deflection and movement from said inner to said outer panel surfaces than deflection in movement from outer to inner panel surfaces when application of said first force thereto;

a second resilient edge on said second panel, said second edge having a second base and inner and outer projections extending therefrom, said projections respectively adjacent to said inner and outer panel surfaces;

means in said second edge base outer projection providing greater deflection in edge movement from said inner panel surface to said outer panel surface than from edge movement from said outer to inner panel surface on application of a second force to said outer edge projection;

a recess defined by and intermediate said second edge inner and outer projections and base;

an interstice defined by said first and second edge projections when said doors are in a fully closed position and said first edge projection enters said recess thereby abutting said first base and second edge projections;

a variable gap in said interstice, said gap defined by said first edge projection and second edge outer projection;

a deformable material in said interstice, said material extending through said gap;

wherein withdrawal of said deformable material in a direction from said inside panel surface to said outside panel surface exerts said first and second forces on said projections and said projection of said first edge projection and second edge outer projection increases said gap, thereby permitting withdrawal of said material.

10. In a system for power operation of biparting doors in a mass transit vehicle for controlling passenger travel into and out of said vehicle, said system incorporating obstruction sensing for preventing car movement until said doors are fully closed, resilient edges on said doors cooperating to seal fully closed doors at a door-passenger interface, said door edges allowing withdrawal of trapped deformable objects, the improvement comprising:

inner and outer surfaces on said panels;

a first resilient edge on one of said panels having a first base and a first projection extending therefrom, said projection resiliently deflectable about said base on application of a force thereto;

means in said first base projection providing greater deflection in movement of said first projection from said inner to said outer panel surfaces than deflection in movement from outer to inner panel surfaces on application of a force thereto;

a second resilient edge on the other of said panels, said second edge having a second base and inner and outer projections extending therefrom, said projections respectively adjacent to said inner and outer panel surfaces;

means in said second edge base outer projection providing greater deflection in movement from said inner to said outer panel surface than from outer to inner panel surface on application of a force to said outer edge projection;

a recess defined by and intermediate said second edge projections and base;

an interstice defined by said first and second edges when said doors are in a fully closed position and said first edge projection enters said recess thereby abutting said first base and second edge projections;

variable gaps in said interstice, said gaps defined by said first edge projection and second edge outer projections;

a deformable material in said interstice, said material extending through said gap;

means moving said material in a direction outward of said panel outer surfaces wherein said movement of said deformable material through said gap exerts said force on said projections and deflection of said first and second projections increases said gap, thereby permitting withdrawal of said material.

* * * * *